United States Patent [19]

Sanderson

[11] 4,094,401
[45] June 13, 1978

[54] QUICK RELEASE FOR CATERNARY ROLLERS

[75] Inventor: Gerald D. Sanderson, Belleville, Canada

[73] Assignee: Allis-Chalmers Corporation, Milwaukee, Wis.

[21] Appl. No.: 751,377

[22] Filed: Dec. 17, 1976

[51] Int. Cl.² ............................................. B65G 15/60
[52] U.S. Cl. ...................................... 198/827; 24/223; 24/230 A
[58] Field of Search ................ 198/824, 827; 292/264, 292/270; 24/230 A, 223, 211 M

[56] References Cited

U.S. PATENT DOCUMENTS

| 1,824,045 | 9/1931 | Fetyk | 292/264 |
| 2,459,223 | 1/1949 | Henderson | 24/211 M |
| 2,594,609 | 4/1952 | Cosneck | 24/211 M X |
| 4,043,447 | 8/1977 | Donnelly et al. | 198/827 |

FOREIGN PATENT DOCUMENTS

| 359,469 | 5/1938 | Italy | 24/230 A |
| 1,146,098 | 3/1969 | United Kingdom | 198/827 |

Primary Examiner—Evon C. Blunk
Assistant Examiner—Douglas D. Watts
Attorney, Agent, or Firm—Charles L. Schwab

[57] ABSTRACT

Each end of a catenary carrier for an endless conveyor belt is supported by a quick release mechanism operable to drop the catenary rollers out of operation. The quick release mechanism includes a link which has an elongated slot wth an enlarged annular end portion. Supports at opposite ends of the catenary carrier carry a rotatable support pin for the link which has a head portion and a neck portion. The neck portion is annular except for two flats formed on radially opposite sides thereof. When the neck of the pin is disposed in the annular end portion of the slot, the link will be locked against movement relative to the pin in the direction toward the carrier if the flats are transverse to the slot. When the support pin is rotated 90° to present the narrow width of the neck in alignment with the slot, the weight of the carrier will cause the link to move relative to the pin whereby the neck of the pin will be disposed in the opposite end of the slot from said annular portion. This action drops the catenary rollers from their supporting relationship with the conveyor belt. The opposite end of the slot is enlarged to permit the link to be removed from the head end of the pin.

7 Claims, 3 Drawing Figures

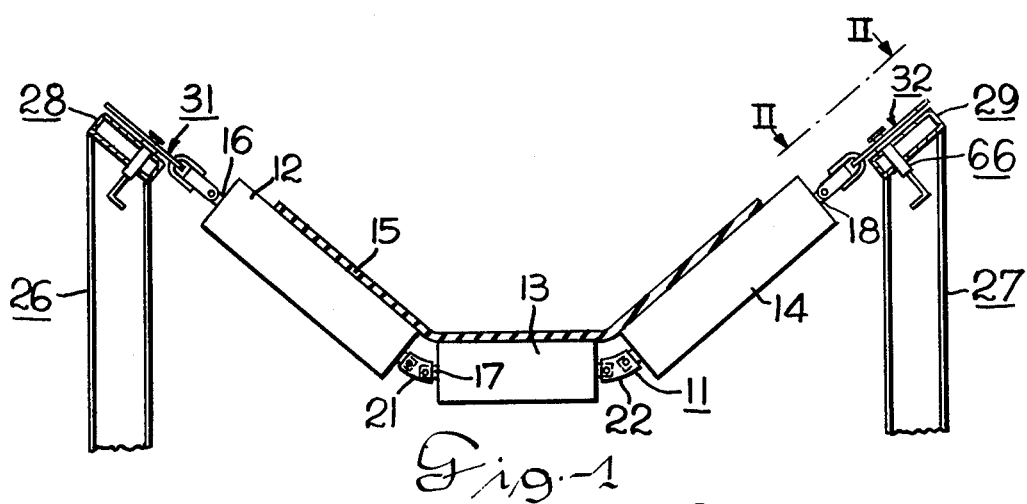
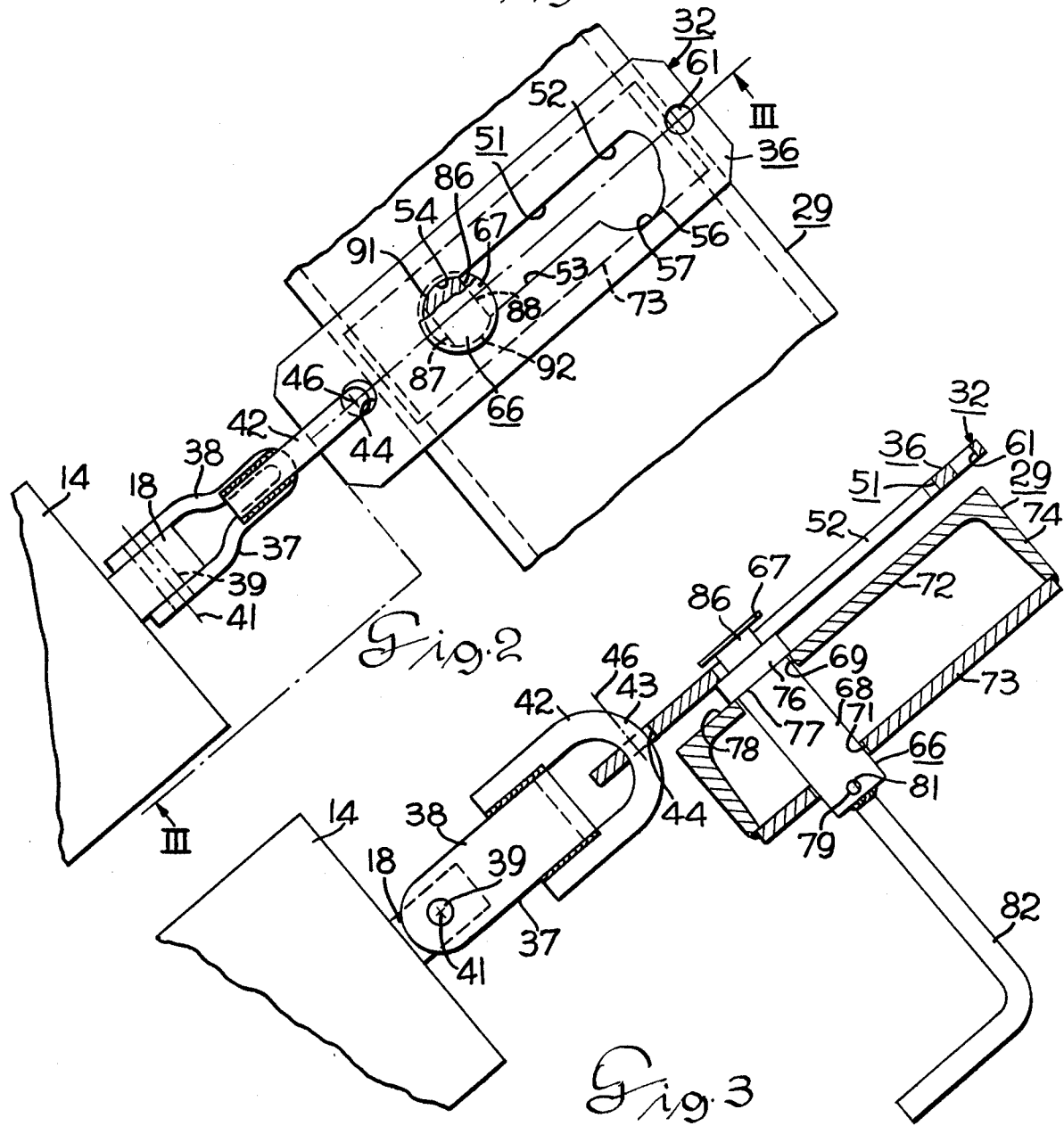

QUICK RELEASE FOR CATERNARY ROLLERS

BACKGROUND OF THE INVENTION

Heretofore, others have used links to support catenary carriers which permit the catenary carrier to be dropped out of engagement with the belt which it normally supports. One such device is shown in Canadian Pat. No. 831,356 issued Jan. 6, 1970 to Marcel Allendorf for Fastening Device for Troughing Roll and Conveyor Belts having Said Fastening Device.

BRIEF DESCRIPTION OF THE INVENTION

Each end of the catenary carrier has an elongated link which is pivotally connected at one end to the end of the catenary carrier and includes a slot at its other end aligned in the general elongated direction of the link. The end of the slot nearest to the end of the carrier to which the link is connected has an enlarged annular portion which is wider than the main part of the slot. A rotatable support pin is pivotally mounted on a catenary carrier support and includes a head portion at its upper end and a neck portion between the head portion and the support which has a reduced dimension in one radial direction and an enlarged radial dimension at approximately 90° to the reduced radial dimension. When the neck of the pin is disposed in the slot with the enlarged radial dimension oriented in the direction of the slot, the link may slide on the pin. However, when the neck of the pin is disposed in the enlarged annular portion of the slot and oriented to present the enlarged dimension of the neck transversely to the direction of the slot, the link cannot be shifted relative to the pin. The end of the slot remote from the catenary carrier is enlarged to permit removal of the link from its support pin.

BRIEF DESCRIPTION OF THE DRAWINGS

FIG. 1 illustrates a catenary carrier and supporting structure wherein the present invention is utilized;

FIG. 2 is an enlarged view taken along the line II—II; and

FIG. 3 is a section view taken along the line III—III in FIG. 2.

DETAILED DESCRIPTION OF THE DRAWINGS

Referring to FIG. 1, a catenary carrier 11 for the working run of a conveyor belt 15 includes rollers 12, 13, 14 rotatably mounted on shafts 16, 17, 18 which are interconnected by links 21, 22. Supports 26, 27 are provided at opposite ends of the carrier which include longitudinally disposed support beams 28, 29, respectively. The catenary carrier 11 is supported at its opposite ends on the supports 26, 27 by quick release mechanisms 31, 32 which are identical in construction. Only the quick release mechanism 32 will be described in detail. Referring also to FIGS. 2 and 3, the quick release mechanism 32 includes a flat plate or link 36 which is in general alignment with the catenary carrier 11 and has its end nearest to the catenary carrier pivotally connected to the roller shaft 18 by a clevis 37. The clevis 37 has a first U-shaped part 38 with its legs pivotally connected to the shaft 18 by a pin 39 whose axis is disposed on a horizontal axis 41. The clevis also includes a U-shaped member 42 which has its legs welded to the U-shaped part 38 and has a curved portion 43 which extends through a vertical opening 44 in the link 36. The interconnection between the clevis part 42 and the link 36 permits the axis 41. Thus the catenary carrier shaft 18 is free to swing vertically about pivot axis 41 and horizontally about axis 46.

The link 36 includes a slot 51 which has a channel portion of predetermined transverse width defined by its side walls 52, 53. The end of the slot 51, nearest the catenary carrier 11 includes an enlarged annular portion defined by an arcuate wall presenting a cylindrical surface 54. The diameter of the cylindrical surface 54 is greater than the width of the slot 51, defined by the side walls 52, 53. An enlarged opening 56 is created by a recess 57 in the upper or outer end of the slot 51. The link 36 is supported on a pin 66, disposed on an axis 66' perpendicular to the link, which is rotatably mounted on the support beam 29 for pivotal movement between carrier supporting and carrier releasing positions. The pin 66 has a head portion 67 and a neck 86 to which the link 36 is hooked. A bearing portion 68 of the pin 66 is rotatably mounted in a pair of aligned bores 69, 71 in the upper and lower walls 72, 73 of the box section support member 29. As is shown in FIG. 3, the frame is fabricated by welding a plate forming the wall 73 to a channel 74. An enlarged annular shoulder 76 is formed on the pin 66 intermediate the neck 86 and the bearing portion 68. The shoulder presents a flat bearing surface 77 in bearing engagement with the outwardly facing flat surface 78 on the top side of the support member 29. The pin 66 is locked against axial withdrawal from the support member 29 by a transversely disposed pin 79 which is press fit in a transverse bore 81 on the bottom end of the pin 66. An L-shaped handle 82 is welded on the bottom end of the pin 66 so as to permit manual rotation of the pin 66. The dimension of the neck 86 parallel to the parallel flat faces or surfaces 87, 88 is greater than the width of the slot 51, such dimension being the diameter of a circle defined by concentric annular surfaces 91, 92. As shown in FIGS. 2 and 3, the large radial dimension of the neck 86 of the pin 66 is in cooperative engagement with the enlarged annular portion defined by cylindrical surface 54 of the slot 51, thus locking the link 36 against movement in the direction of the slot. In other words, the link 36 is locked against translatory movement in the direction of the carrier 11. The annular head 67 on the upper end of the pin 66 has a larger diameter than annular surface 54 which serves to keep the link 36 from being moved upwardly off the pin when it is locked thereto, as shown in FIGS. 2 and 3.

When it is desired to lower the catenary carrier 11, as might be desired when servicing or replacing the rollers, the pin 66 is manually turned 90° by use of the lever 82. This pivotal movement of the pin 66 aligns the narrow radial width of the neck 86 with the slot 51, at which time the link 36 and carrier 11 will move downwardly by gravity. If it is desired to remove the link 36 from the pin 66, the link 36 may be shifted slightly so that the head 67 of the pin aligns with the enlarged opening 56 at the upper end of the link 36, thereby permitting the link 36 to be lifted off of the pin 66. The opening 61 in the outer end of the link 36 may be used to attach an appropriate lifting or pulling device to facilitate installation of the link 36 on and removal of the link 36 from the pin 66.

By using the hereinbefore described quick release mechanism, the catenary carrier can quickly be dropped or released from its operative belt supporting position, shown in FIG. 1, to a lowered, nonoperative position. This is accomplished by manually rotating the support pins of the release mechanisms 31, 32 90° from their locking position illustrated in FIGS. 2 and 3.

The embodiments of the invention in which an exclusive property or privilege is claimed are defined as follows:

1. A quick release mechanism for a catenary carrier for a conveyor belt comprising:
   a support having walls defining a cylindrical opening;
   a link adapted at one end for attachment to one end of a catenary carrier for a conveyor belt moving in a predetermined direction and including wall means at its other end defining an elongated slot with opposite closed ends, said wall means including a pair of spaced walls defining a channel portion of said slot of predetermined width and an arcuate wall defining an annular portion at the closed end of said slot nearest said carrier, said annular portion having a diameter of greater dimension than the width of said channel portion of said slot; and
   a locking pin having
      a cylindrical bearing portion pivotally mounted in said cylindrical opening, and
      a neck disposed in said slot presenting a pair of diametrically opposite concentric annular surfaces and a pair of diametrically opposite faces spaced a distance from one another less than the diameter of said annular surfaces and less than the width of said channel portion of said slot;
   said pin being pivotable between a locking position wherein said annular surfaces engage diametrically opposite portions of said arcuate wall whereby said annular portion of said slot is supported on said neck of said pin and a release position wherein said faces are aligned with said channel portion of said slot thereby allowing said link to slide on said pin to place said catenary carrier in a lowered position wherein said pin abuts the wall means at the closed end of said slot remote from said carrier.

2. The mechanism of claim 1 wherein said wall means include walls defining an enlarged portion in said slot at the end of the latter remote from said one end of said link, said enlarged portion being dimensioned to permit withdrawal of said link from said pin when the latter is disposed in said enlarged portion.

3. The mechanism of claim 1 wherein said pin includes a head portion adjacent the axial end of said neck remote from said cylindrical portion, said head having a greater width than the diameter of said annular portion whereby said link cannot be removed axially from said pin when said neck is in said annular portion of said slot.

4. The mechanism of claim 3 wherein said wall means include walls defining an enlarged portion in said slot at the end of the latter remote from said one end of said link, said enlarged portion being dimensioned to permit withdrawal of said link axially from said pin when the latter is disposed in said enlarged portion.

5. The mechanism of claim 1, wherein said pin includes a manually operable handle facilitating pivotal movement of said pin.

6. The mechanism of claim 1 wherein said pin includes an enlarged diameter shoulder in axial thrust transmitting engagement with said support, said shoulder having a larger diameter than said cylindrical opening of said support and being disposed between said neck and said cylindrical portion.

7. In combination with an endless belt conveyor having a catenary carrier with rollers supporting the working run of the conveyor belt;
   supports at laterally opposite sides of said belt;
   means connecting opposite ends of said carrier to said supports including
      a quick release mechanism for connecting one end of said carrier to one of said supports including;
         a link with one end pivotally connected to said one end of said carrier and having walls defining a slot having a relatively narrow elongated channel portion and enlarged portions at the opposite ends of said channel portion, and
         a support pin pivotally mounted on said one support on an axis perpendicular to said link for pivotal movement between carrier supporting and carrier releasing positions, said pin having a neck disposed in said slot with a first pair of radially opposite side wall surfaces which are closer together than a second pair of radially opposite arcuate side wall surfaces, said second pair of side wall surfaces engaging the walls defining the enlarged portion at the end of said slot closest to said one end of said link whereby said link is supported on said pin when said support pin is in its carrier supporting position, said link sliding on said pin when the latter is pivoted to its carrier release position wherein said second pair of side wall surfaces are aligned with said channel portion of said slot permitting said link to slide on said neck from one end of said slot to the other by way of said channel portion.

* * * * *